United States Patent
Paladugu et al.

(10) Patent No.: US 11,812,481 B2
(45) Date of Patent: Nov. 7, 2023

(54) LAYER 2 RELAY UNICAST LINK SETUP

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/176,785

(22) Filed: Feb. 16, 2021

(65) Prior Publication Data

US 2021/0282195 A1 Sep. 9, 2021

Related U.S. Application Data

(60) Provisional application No. 62/986,329, filed on Mar. 6, 2020.

(51) Int. Cl.
*H04W 88/04* (2009.01)
*H04W 76/10* (2018.01)
(Continued)

(52) U.S. Cl.
CPC ............ *H04W 76/10* (2018.02); *H04W 4/90* (2018.02); *H04W 40/22* (2013.01); *H04W 72/20* (2023.01)

(58) Field of Classification Search
CPC ....... H04W 76/10; H04W 4/90; H04W 40/22; H04W 72/0406; H04W 76/12; H04W 88/04; H04W 76/14
See application file for complete search history.

(56) References Cited

U.S. PATENT DOCUMENTS

2017/0359766 A1* 12/2017 Agiwal ................. H04L 5/0048
2019/0110238 A1* 4/2019 Buckley ................ H04W 12/06
(Continued)

FOREIGN PATENT DOCUMENTS

WO 2018063082 A1 4/2018
WO WO-2018063082 A1 * 4/2018 ............ H04W 76/11

OTHER PUBLICATIONS

3GPP TR 23.733: "3rd Generation Partnership Project; Technical Specification Group Services and System Aspects; Study on Architecture Enhancements to ProSe UE-to-Network Relay (Release 15)", 3GPP Standard, Technical Report, 3GPP TR 23.733, 3rd Generation Partnership Project (3GPP), Mobile Competence Centre, 650, Route Des Lucioles, F-06921 Sophia-Antipolis Cedex, France, vol. SA WG2. No. V15.1.0, Dec. 22, 2017 (Dec. 22, 2017), pp. 1-81, XP051392106, [retrieved on Dec. 22, 2017], p. 64-p. 67, figures 6.6.1.1.4-1, paragraph [6.2.3].
(Continued)

*Primary Examiner* — Joseph E Dean, Jr.
(74) *Attorney, Agent, or Firm* — Harrity & Harrity, LLP

(57) ABSTRACT

Various aspects of the present disclosure generally relate to wireless communication. In some aspects, a remote user equipment (UE) may transmit, to a relay UE, a request for a Layer 2 relay service and a relay service code associated with the Layer 2 relay service; receive, from the relay UE, a message indicating that the relay UE accepts the Layer 2 relay service associated with the relay service code; establish a radio access signaling radio bearer (SRB) for the Layer 2 relay service using a remote UE radio access SRB configuration; and communicate via the radio access SRB. Numerous other aspects are provided.

30 Claims, 12 Drawing Sheets

(51) Int. Cl.
*H04W 4/90* (2018.01)
*H04W 40/22* (2009.01)
*H04W 72/20* (2023.01)

(56) References Cited

U.S. PATENT DOCUMENTS

| | | | |
|---|---|---|---|
| 2019/0261450 A1 | 8/2019 | Adachi et al. | |
| 2020/0100167 A1* | 3/2020 | Cheng | H04W 80/02 |
| 2020/0329513 A1* | 10/2020 | Pan | H04W 76/11 |
| 2020/0351699 A1* | 11/2020 | Pan | H04W 76/27 |

OTHER PUBLICATIONS

International Search Report and Written Opinion—PCT/US2021/018393—ISA/EPO—dated May 26, 2021.
ZTE: "Discussion on Connection Establishment and Bearer Setup", 3GPP Draft, R2-168149, 3GPP TSG-RAN WG2 Meeting #96, Discussion on Connection Establishment and Bearer Setup, 3rd Generation Partnership Project (3GPP), Mobile Competence Centre, 650, Route Des Lucioles, F-06921 Sophia-Antipolis, vol. RAN WG2. No. Reno. USA, Nov. 14, 2016-Nov. 18, 2016, Nov. 13, 2016 (Nov. 13, 2016), XP051177836, 4 Pages, Retrieved from the Internet: URL: http://www.3gpp.org/ftp/Meetings_3GPP_SYNC/RAN2/Docs/ [retrieved on Nov. 13, 2016] the Whole Document.

* cited by examiner

LAYER 2 RELAY UNICAST LINK SETUP

CROSS-REFERENCE TO RELATED APPLICATION

This Patent Application claims priority to U.S. Provisional Patent Application No. 62/986,329, filed on Mar. 6, 2020, entitled "LAYER 2 RELAY UNICAST LINK SETUP," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for Layer 2 relay unicast link setup.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a remote user equipment (UE), may include transmitting, to a relay UE, a request for a Layer 2 relay service and a relay service code associated with the Layer 2 relay service; receiving, from the relay UE, a message indicating that the relay UE accepts the Layer 2 relay service associated with the relay service code; establishing a radio access signaling radio bearer (SRB) for the Layer 2 relay service using a remote UE radio access SRB configuration; and communicating via the radio access SRB.

In some aspects, a method of wireless communication, performed by a relay UE, may include receiving, from a remote UE, a request for a Layer 2 relay service and a relay service code associated with the Layer 2 relay service; providing, to the remote UE, a message indicating whether the relay UE accepts the Layer 2 relay service based at least in part on the relay service code; and establishing, when the relay UE accepts the Layer 2 relay service associated with the relay service code, a radio access SRB with the remote UE for the Layer 2 relay service using a remote UE radio access SRB configuration.

In some aspects, a method of wireless communication, performed by a base station, may include receiving, from a relay UE, an indication that the relay UE supports a Layer 2 relay service; transmitting a relaying configuration to the relay UE based at least in part on the indication; and communicating with a remote UE via the relay UE based at last in part on the relaying configuration.

In some aspects, a remote UE for wireless communication may include a memory and one or more processors operatively coupled to the memory. The memory and the one or more processors may be configured to transmit, to a relay UE, a request for a Layer 2 relay service and a relay service code associated with the Layer 2 relay service; receive, from the relay UE, a message indicating that the relay UE accepts the Layer 2 relay service associated with the relay service code; establish a radio access SRB for the Layer 2 relay service using a remote UE radio access SRB configuration; and communicate via the radio access SRB.

In some aspects, a relay UE for wireless communication may include a memory and one or more processors operatively coupled to the memory. The memory and the one or more processors may be configured to receive, from a remote UE, a request for a Layer 2 relay service and a relay service code associated with the Layer 2 relay service; provide, to the remote UE, a message indicating whether the relay UE accepts the Layer 2 relay service based at least in part on the relay service code; and establish, when the relay UE accepts the Layer 2 relay service associated with the relay service code, a radio access SRB with the remote UE for the Layer 2 relay service using a remote UE radio access SRB configuration.

In some aspects, a base station for wireless communication may include a memory and one or more processors operatively coupled to the memory. The memory and the one or more processors may be configured to receive, from a relay UE, an indication that the relay UE supports a Layer 2 relay service; transmit a relaying configuration to the relay UE based at least in part on the indication; and communicate with a remote UE via the relay UE based at last in part on the relaying configuration.

In some aspects, a non-transitory computer-readable medium may store one or more instructions for wireless communication. The one or more instructions, when executed by one or more processors of a remote UE, may cause the one or more processors to transmit, to a relay UE, a request for a Layer 2 relay service and a relay service code associated with the Layer 2 relay service; receive, from the relay UE, a message indicating that the relay UE accepts the Layer 2 relay service associated with the relay service code; establish a radio access SRB for the Layer 2 relay service using a remote UE radio access SRB configuration; and communicate via the radio access SRB.

In some aspects, a non-transitory computer-readable medium may store one or more instructions for wireless communication. The one or more instructions, when executed by one or more processors of a relay UE, may cause the one or more processors to receive, from a remote UE, a request for a Layer 2 relay service and a relay service code associated with the Layer 2 relay service; provide, to the remote UE, a message indicating whether the relay UE accepts the Layer 2 relay service based at least in part on the relay service code; and establish, when the relay UE accepts the Layer 2 relay service associated with the relay service code, a radio access SRB with the remote UE for the Layer 2 relay service using a remote UE radio access SRB configuration.

In some aspects, a non-transitory computer-readable medium may store one or more instructions for wireless communication. The one or more instructions, when executed by one or more processors of a base station, may cause the one or more processors to receive, from a relay UE, an indication that the relay UE supports a Layer 2 relay service; transmit a relaying configuration to the relay UE based at least in part on the indication; and communicate with a remote UE via the relay UE based at last in part on the relaying configuration.

In some aspects, an apparatus for wireless communication may include means for transmitting, to a relay UE, a request for a Layer 2 relay service and a relay service code associated with the Layer 2 relay service; means for receiving, from the relay UE, a message indicating that the relay UE accepts the Layer 2 relay service associated with the relay service code; means for establishing a radio access SRB for the Layer 2 relay service using a remote UE radio access SRB configuration; and means for communicating via the radio access SRB.

In some aspects, an apparatus for wireless communication may include means for receiving, from a remote UE, a request for a Layer 2 relay service and a relay service code associated with the Layer 2 relay service; means for providing, to the remote UE, a message indicating whether the apparatus accepts the Layer 2 relay service based at least in part on the relay service code; and means for establishing, when the relay UE accepts the Layer 2 relay service associated with the relay service code, a radio access SRB with the remote UE for the Layer 2 relay service using a remote UE radio access SRB configuration.

In some aspects, an apparatus for wireless communication may include means for receiving, from a relay UE, an indication that the relay UE supports a Layer 2 relay service; means for transmitting a relaying configuration to the relay UE based at least in part on the indication; and means for communicating with a remote UE via the relay UE based at last in part on the relaying configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
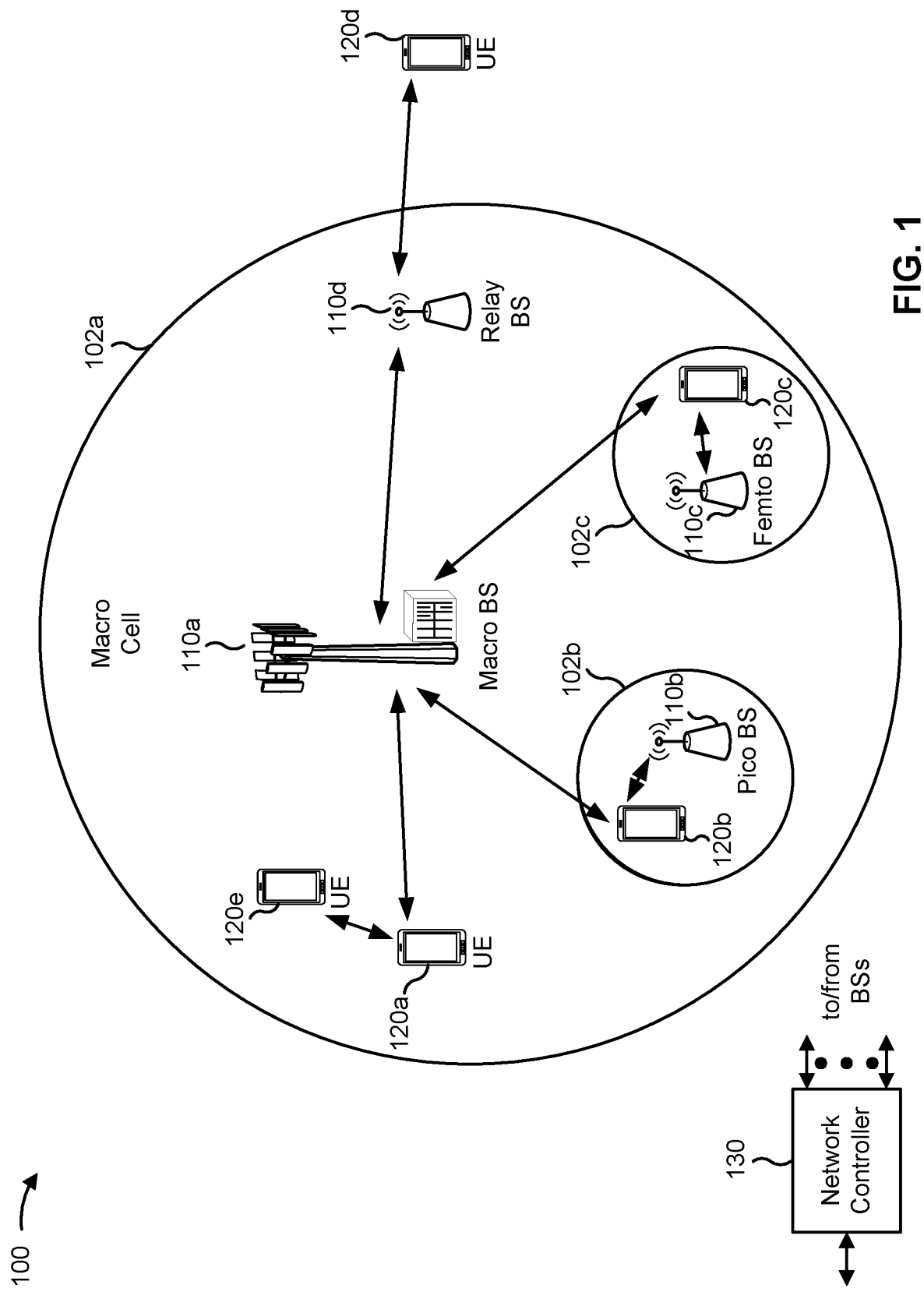
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
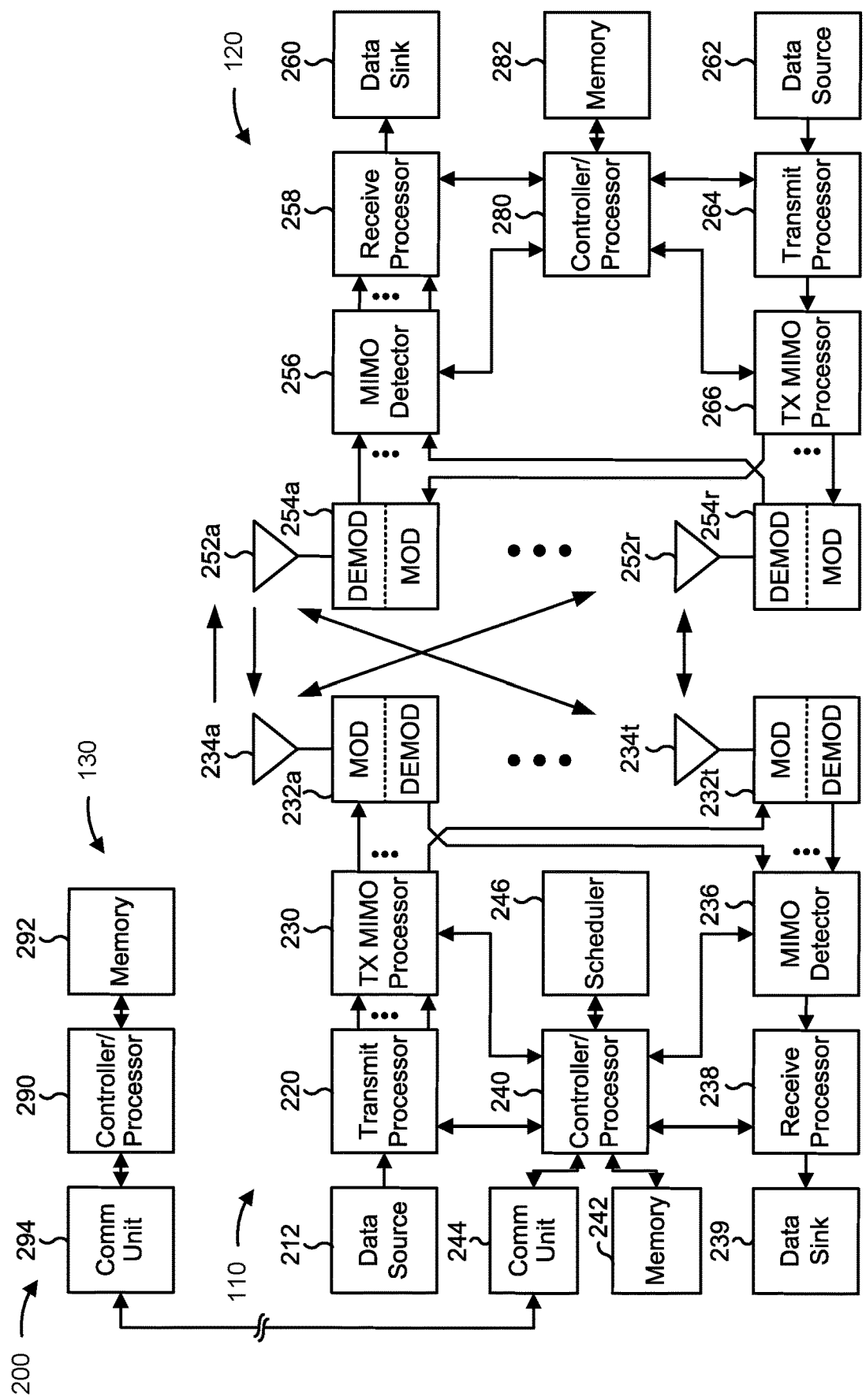
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-12.

Controller/processor 240 of base station 110, controller/processor 280 of UE 120, and/or any other component(s) of FIG. 2 may perform one or more techniques associated with Layer 2 relay unicast link setup, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for transmitting, to a relay UE, a request for a Layer 2 relay service and a relay service code associated with the Layer 2 relay service; means for receiving, from the relay UE, a message indicating that the relay UE accepts the Layer 2 relay service associated with the relay service code; means for establishing a radio access SRB for the Layer 2 relay service using a remote UE radio access SRB configuration; means for communicating via the radio access SRB; means for receiving the remote UE radio access SRB configuration from the relay UE; means for receiving, from a remote UE, a request for a Layer 2 relay service and a relay service code associated with the Layer 2 relay service; means for providing, to the remote UE, a message indicating whether the relay UE accepts the Layer 2 relay service based at least in part on the relay service code; means for establishing, when the relay UE accepts the Layer 2 relay service associated with the relay service code, a radio access SRB with the remote UE for the Layer 2 relay service using a remote UE radio access SRB configuration; means for providing the remote UE radio access SRB configuration to the remote UE; means for providing, to a base station, an indication that the relay UE supports the Layer 2 relay service; means for receiving a relaying configuration from the base station based at least in part on the indication; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a relay UE, an indication that the relay UE supports a Layer 2 relay service; means for transmitting a relaying configuration to the relay UE based at least in part on the indication; means for communicating with a remote UE via the relay UE based at last in part on the relaying configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
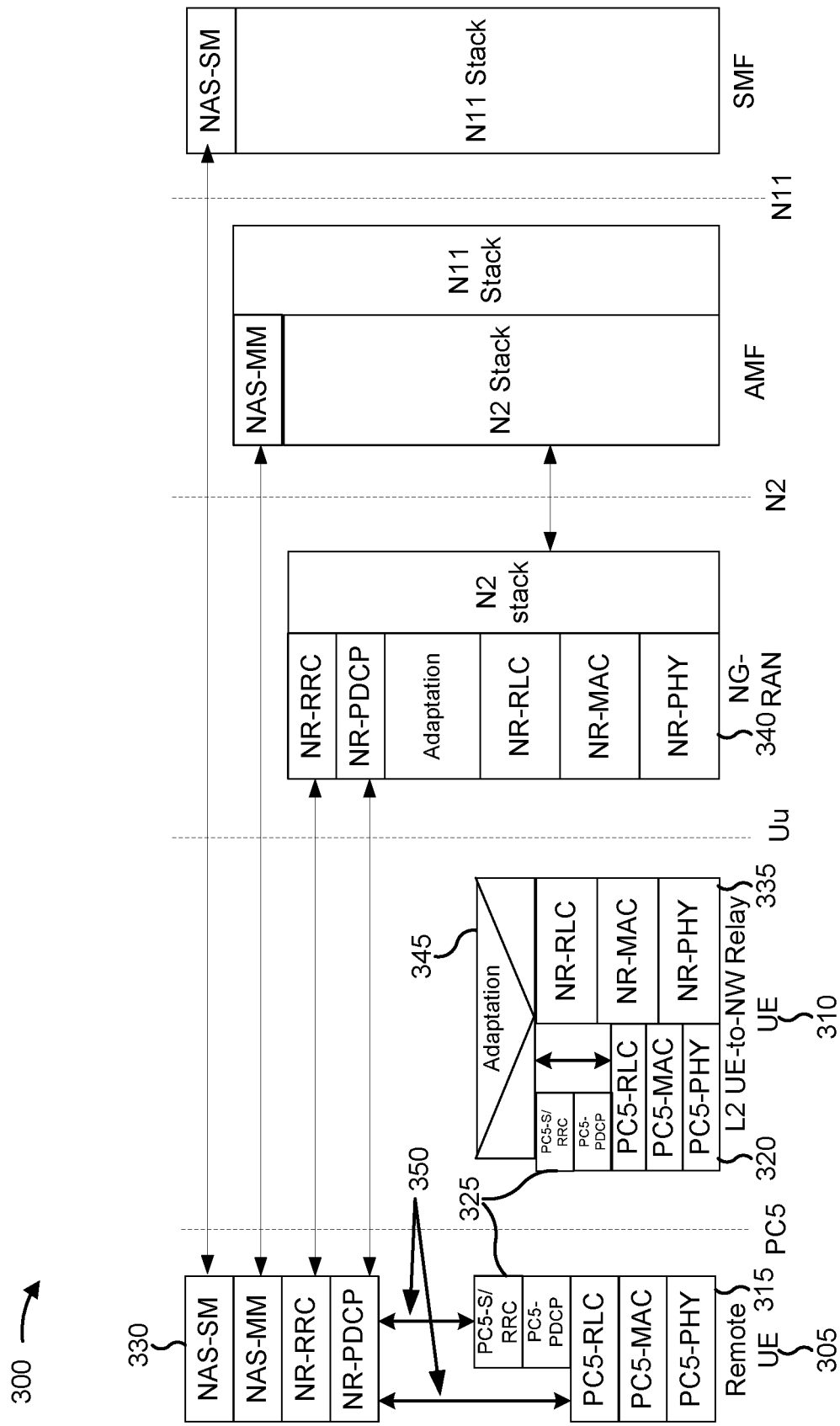
FIG. 3 is a diagram illustrating an example of a control-plane protocol architecture for a Layer 2 UE-to-network relay, in accordance with the present disclosure.
Figure 4:
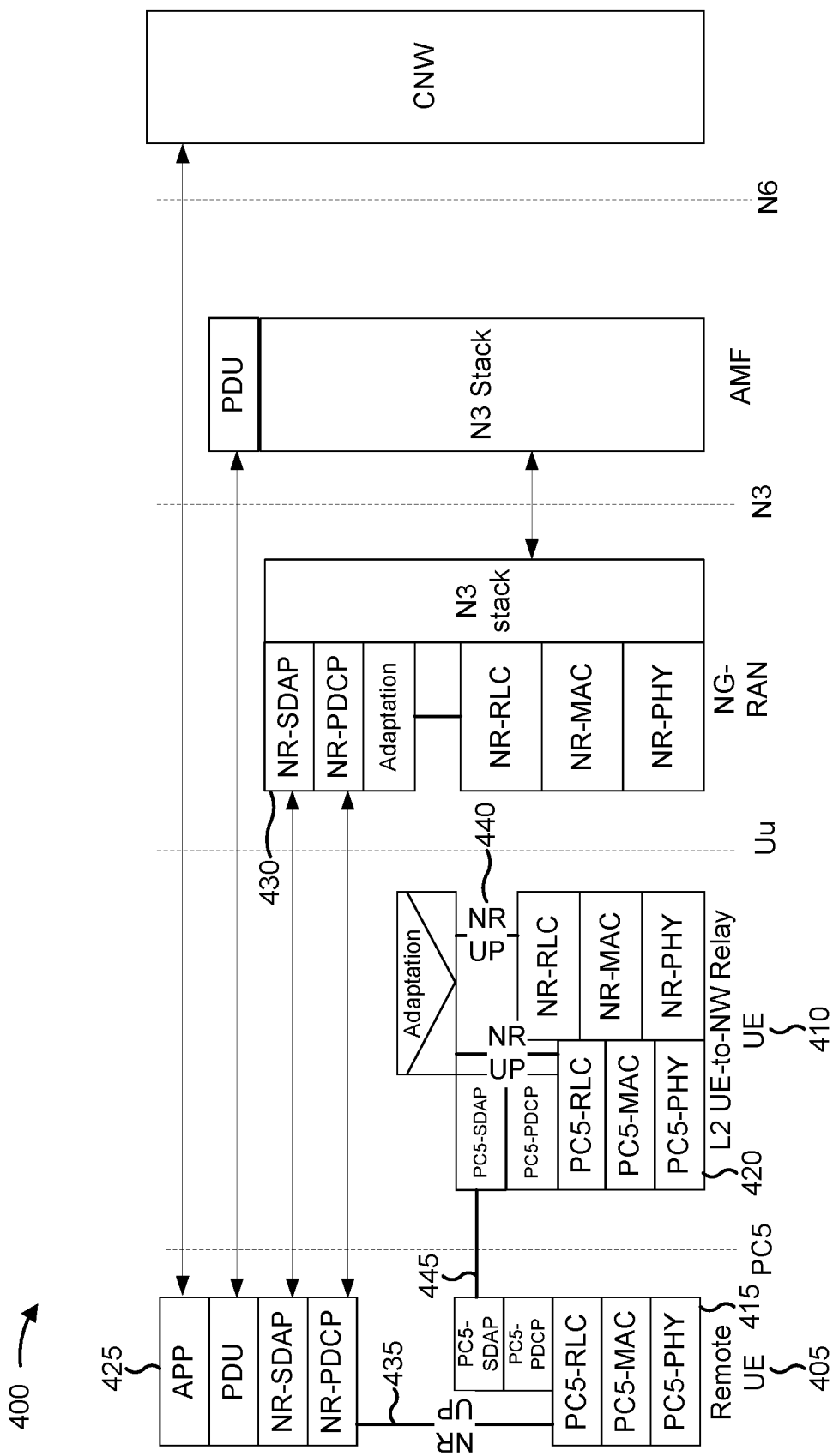
FIG. 4 is a diagram illustrating an example of a user-plane protocol architecture for a Layer 2 UE-to-network relay, in accordance with the present disclosure.

FIG. 3 is a diagram illustrating an example of a control-plane protocol architecture 300 for a Layer 2 UE-to-network relay, in accordance with the present disclosure. FIG. 4 is a diagram illustrating an example of a user-plane protocol architecture 400 for a Layer 2 UE-to-network relay, in accordance with the present disclosure. For example, the control-plane protocol architecture 300 and the user-plane protocol architecture 400 may correspond to a remote UE (e.g., UE 120) shown by reference numbers 305 and 405 and a relay UE (e.g., UE 120) shown by reference numbers 310 and 410.

As shown in FIG. 3, in the control-plane, there may be a PC5 interface (e.g., a sidelink interface) between the remote UE and the relay UE, a Uu interface between the relay UE and a next generation radio access network (NG-RAN, also referred to herein as a 5G access network (5G-AN)), an N2 interface between the NG-RAN and an access and mobility management function (AMF) of the control-plane protocol architecture 300, and an N11 interface between the AMF and a session management function (SMF).

As shown in FIG. 4, there may be an N3 interface between the NG-RAN and a user-plane function (UPF) of the user-plane protocol architecture 400, and an N6 interface between the UPF and a core network (CNW).

As further shown, the remote UE and the relay UE may be associated with respective PC5 protocol stacks 315/320 and 415/420, enabling communication on the PC5 interface between the remote UE and the relay UE. The PC5 protocol stack may include a PC5 radio link control (RLC) component, a PC5 medium access control (MAC) component, a PC5 physical (PHY) component, and/or the like.

Communications between the remote UE and the relay UE using the PC5 interface may be referred to as sidelink communications. The respective PC5 protocol stacks may be associated with one or more of PC5-S entities, PC5-radio resource control (RRC) entities, or PC5-PDCP entities, as shown by reference number 325. The PC5-S entity may manage a sidelink signaling interface, such as a PC5-S interface. A UE that includes a PC5-S entity and/or a PC5-RRC entity may handle control signaling and configuration of a sidelink connection with another UE, such as the connection used for relaying between the remote UE and the relay UE. In some aspects, the PC5 protocol stacks 315/320 and 415/420 may not include PC5-S entities or PC5-RRC entities. In such a case, the NG-RAN may handle control signaling and configuration of the sidelink connection. A Layer 2 relay service that uses UEs with a PC5-S/PC5-RRC entity may be referred to as an L2' (e.g., L2-prime) relay service, whereas a Layer 2 relay service that uses UEs without a PC5-S/PC5-RRC entity may be referred to as an L2 relay service.

As shown by reference number 330 of FIG. 3, the remote UE is associated with a non-access stratum (NAS) stack, which includes an NAS session management (NAS-SM) component, an NAS session management (NAS-SM) component, and one or more radio access components (e.g., an NR-RRC component and an NR-PDCP component). As shown by reference number 335 of FIG. 3, the relay UE is associated with a radio access stack, including an NR-RLC component, an NR-MAC component, and an NR-PHY component. Furthermore, the NG-RAN is associated with a radio access interface stack shown by reference number 340, which includes an NR-RLC component, an NR-MAC component, an NR-PHY component, an NR-RRC entity, and an NR-PDCP entity.

The adaptation layer entity of the relay UE, shown by reference number 345, may handle relaying from the remote UE to the network or from the network to the remote UE. As used herein, "the network" may refer to any one or more of the NG-RAN, the AMF, the SMF, the UPF, or the core network (CNW). In some aspects, the adaptation layer is referred to as an adaptation layer entity. In some aspects, the adaptation layer entity may be a separate entity between a radio link control entity and a packet data convergence entity. In some aspects, the adaptation layer entity may be logically part of the packet data convergence entity or the radio link control entity Communication between stacks of the remote UE is indicated by the lines shown by reference number 350. The line between the NR-PDCP entity and the PC5-RLC entity indicates how a message (e.g., an NR RRC message generated by the radio access protocol stack) that is not encapsulated in a sidelink signaling container, such as a PC5-S container, might be communicated from the radio access stack to the PC5 stack for transmission via the sidelink interface, or how a message that is not encapsulated in a PC5-S container might be communicated from the PC5 stack to the radio access stack after being received via the sidelink interface. Note that the line between the NR-PDCP entity and the PC5-RLC entity does not involve the PC5-S or PC5-PDCP entities, meaning that the PC5-S and PC5-PDCP entities do not handle such messages. A similar line is shown to indicate communication between the adaptation layer and the PC5-RLC entity that bypasses the PC5-S and PC5-PDCP entities of the relay UE.

The line between the NR-PDCP entity and the PC5-S or PC5-RRC entity indicates how a message (e.g., an NR RRC message generated by the radio access protocol stack) that is encapsulated in a PC5-S container might be communicated from the radio access stack to the PC5 stack for transmission via the sidelink interface, or how a message that is encapsulated in a PC5-S container might be communicated from the PC5 stack to the radio access stack after being received via the sidelink interface. Note that the line between the NR-PDCP entity and the PC5-RLC entity involves the PC5-S entity, meaning that the PC5-S entity may handle such messages.

As shown by reference number 425 of FIG. 4, the remote UE is associated with a user-plane protocol stack, which may include an application (APP) component, a protocol data unit (PDU) component, an NR-SDAP component, and an NR-PDCP component. Furthermore, the NG-RAN is associated with user-plane components shown by reference number 430, which include an NR-SDAP component and an NR-PDCP component. The NR-SDAP component and the NR-PDCP component may be referred to herein as radio access entities.

NR user-plane traffic (shown by a line indicated by "NR UP") may be transported between the NR-PDCP entity and the PC5-RLC component, as shown by reference number 435. Such NR user-plane traffic may be transported to the relay UE via one or more bearers, such as a data radio bearer (DRB) or signaling radio bearer (SRB) established. As shown by reference number 440, the NR user-plane traffic may be provided from the PC5 stack of the relay UE to the adaptation component, and from the adaptation component to the radio access stack of the relay UE. The radio access stack of the relay UE may provide the NR user-plane traffic to the NG-RAN (not shown). Sidelink communications, such as PC5 control messaging and/or the like, may occur between the PC5-SDAP components of the remote UE and the relay UE, as shown by reference number 445.

As indicated above, FIGS. 3 and 4 are provided as examples. Other examples may differ from what is described with respect to FIGS. 3 and 4.

Figure 5:
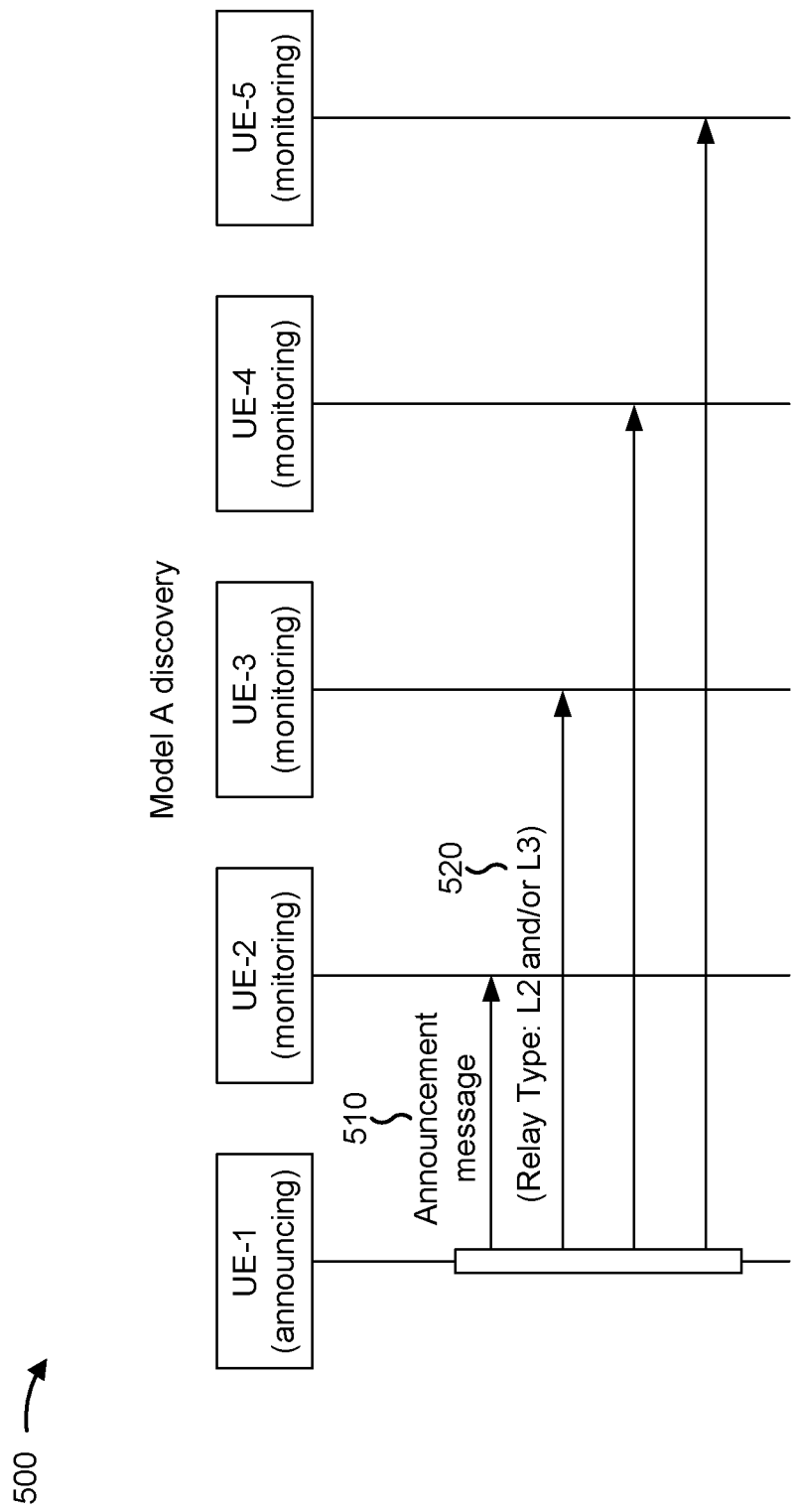
FIG. 5 is a diagram illustrating an example of a first discovery model for UEs performing sidelink communications, in accordance with the present disclosure.

FIG. 5 is a diagram illustrating an example 500 of a first discovery model for UEs performing sidelink communications, in accordance with the present disclosure. The first discovery model may be referred to as Model A. In the first discovery model, a first UE (e.g., UE-1, or an announcing UE) may transmit an announcement message shown by reference number 510. As shown by reference number 520, the announcement message may indicate one or more relay types that the first UE is capable of performing (e.g., L2 relaying, L2' relaying, Layer 3 relaying, and/or the like). For example, the announcement message may include a flag or field indicating the one or more relay types. One or more second UEs (e.g., UE-2 through UE-5, or monitoring UEs) may monitor for the announcement message. For the purposes described herein, the announcing UE may be the relay UE and the monitoring UEs may be the remote UEs.

As indicated above, FIG. 5 is provided as an example. Other examples may differ from what is described with respect to FIG. 5.

Figure 6:
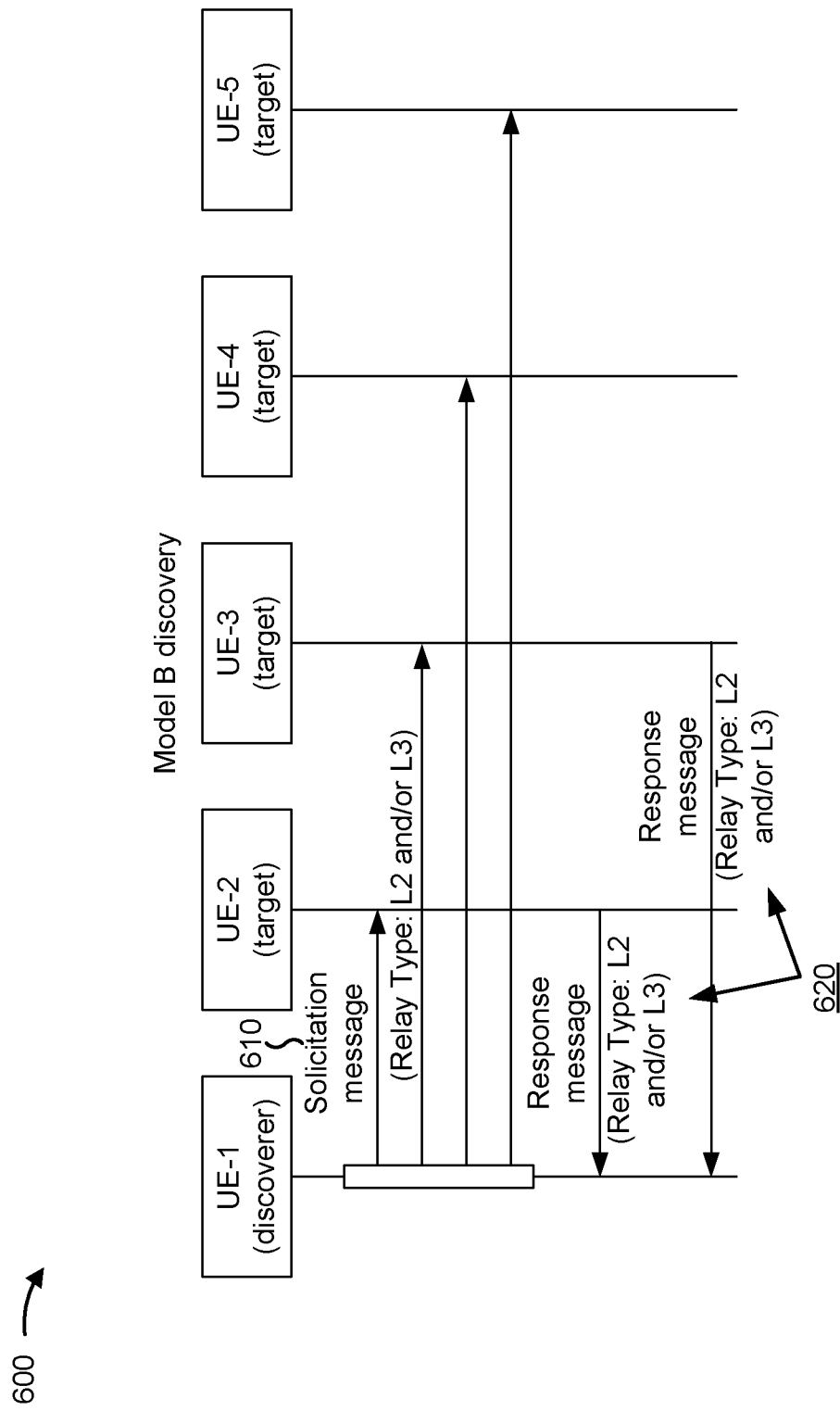
FIG. 6 is a diagram illustrating an example of a second discovery model for UEs performing sidelink communications, in accordance with the present disclosure.

FIG. 6 is a diagram illustrating an example 600 of a second discovery model for UEs performing sidelink communications, in accordance with the present disclosure. The second discovery model may be referred to as Model B. As shown, example 600 includes a discoverer UE (e.g., UE-1) and a set of target UEs (e.g., UE-2 through UE-5).

As shown by reference number 610, the discoverer UE may transmit a solicitation message. As further shown, the solicitation message may indicate one or more relay types that the discoverer UE is capable of performing or desires to use (e.g., L2 relaying, L2' relaying, Layer 3 relaying, and/or the like). For example, the solicitation message may include a flag or field indicating the one or more relay types. As shown by reference number 620, target UEs that receive the solicitation message may provide a response message that indicates one or more relay types supported by the target UE. In some aspects, a target UE may respond if the target UE receives the solicitation message and supports a relay type indicated by the solicitation message. For the purposes described herein, the discoverer UE may be the remote UE and the target UEs may be potential relay UEs for the remote UE.

As indicated above, FIG. 6 is provided as an example. Other examples may differ from what is described with respect to FIG. 6.

A UE (referred to herein as a relay user equipment or relay UE) may relay communications from another UE (referred to herein as a remote user equipment or remote UE) to a network or from the network to the remote UE. In some aspects, the relay UE may perform Layer 2 UE-to-network relaying, in which an adaptation layer in the Layer 2 stack of the relay UE performs forwarding of the remote UE's communications, as compared to Layer 3 relaying which may occur in the Internet Protocol (IP) layer. Communications between the relay UE and the remote UE may be referred to herein as sidelink communications. In some Layer 2 UE-to-network relaying applications, non-access-stratum (NAS) and RRC messages may be transparently transferred between the remote UE and the network using packet data convergence protocol (PDCP) end-to-end connections.

The ProSe Sidelink (PC5) interface may provide a sidelink interface between UEs. For example, Vehicle-to-Anything (V2X) communications in accordance with NR Release 16 may be performed using a PC5 unicast control-plane stack, which may include a PC5 signaling (PC5-S) interface and a PC5 access-stratum (AS) (PC5-AS) interface, such as a PC5-RRC interface. UEs communicating using the PC5 interface may configure a unicast link context and exchange AS information using the PC5-S interface and the PC5-RRC interface. The UEs may be associated with a PC5 user-plane stack, which may include, for example, a PC5-service data adaptation protocol (SDAP) entity, a PC5-PDCP entity, and/or the like. An L2' relay service may use respective PC5-S/PC5-RRC entities of the remote UE and the relay UE to perform link setup and AS configuration for the PC5 interface, whereas an L2 relay service may use a link and AS configuration that is configured by an NG-RAN (e.g., via the NR-RRC interface). FIGS. 3 and 4 describe the user-plane and control-plane architecture associated with L2 and L2' relay services in more detail.

Configuration of the communication link between the remote UE and the relay UE for an L2' relay service may involve certain exchanges of information between the relay UE and the remote UE in order to configure SRBs for the L2' relay service, such as bearer information, relaying information, an AS configuration, and/or the like. However, some communication protocols for PC5 unicast link setup and modification may not provide for such exchanges of information. Furthermore, in some circumstances, it may be undesirable for a relay UE to provide a L2' relay service. For example, the relay UE may be associated with a bandwidth-limited scenario, poor coverage, low battery, and/or the like. As another example, a user of the relay UE may have opted out of providing relay services. Therefore, it may be detrimental to performance of the relay UE or user experience of the relay UE to provide a relay service indiscriminately.

Some techniques and apparatuses described herein provide signaling for unicast link setup or modification to facilitate a L2' relay service. For example, some techniques and apparatuses described herein provide for a remote UE to request a L2' relay service from a relay UE. The request may indicate a relay service code associated with the L2' relay service. The relay UE may selectively accept or deny the L2' relay service request based at least in part on the relay service code. In some aspects, the relay UE may indicate support for the L2' relay service to the NG-RAN, and the NG-RAN may provide a relaying configuration for the L2' relay service. The relay UE may provide at least part of the relaying configuration to the remote UE. The remote UE and the relay UE may configure SRBs and/or a unicast link for the L2' relay service in accordance with the relaying configuration. In this way, configuration of SRBs on a unicast link for a L2' relay service is enabled. Furthermore, the relay UE can selectively accept or reject the L2' relay service based at least in part on a relay service code, thereby improving the relay UE's performance and resource utilization in a situation when the relay UE's performance or resource utilization would be negatively impacted by the L2' relay service.

Figure 7:
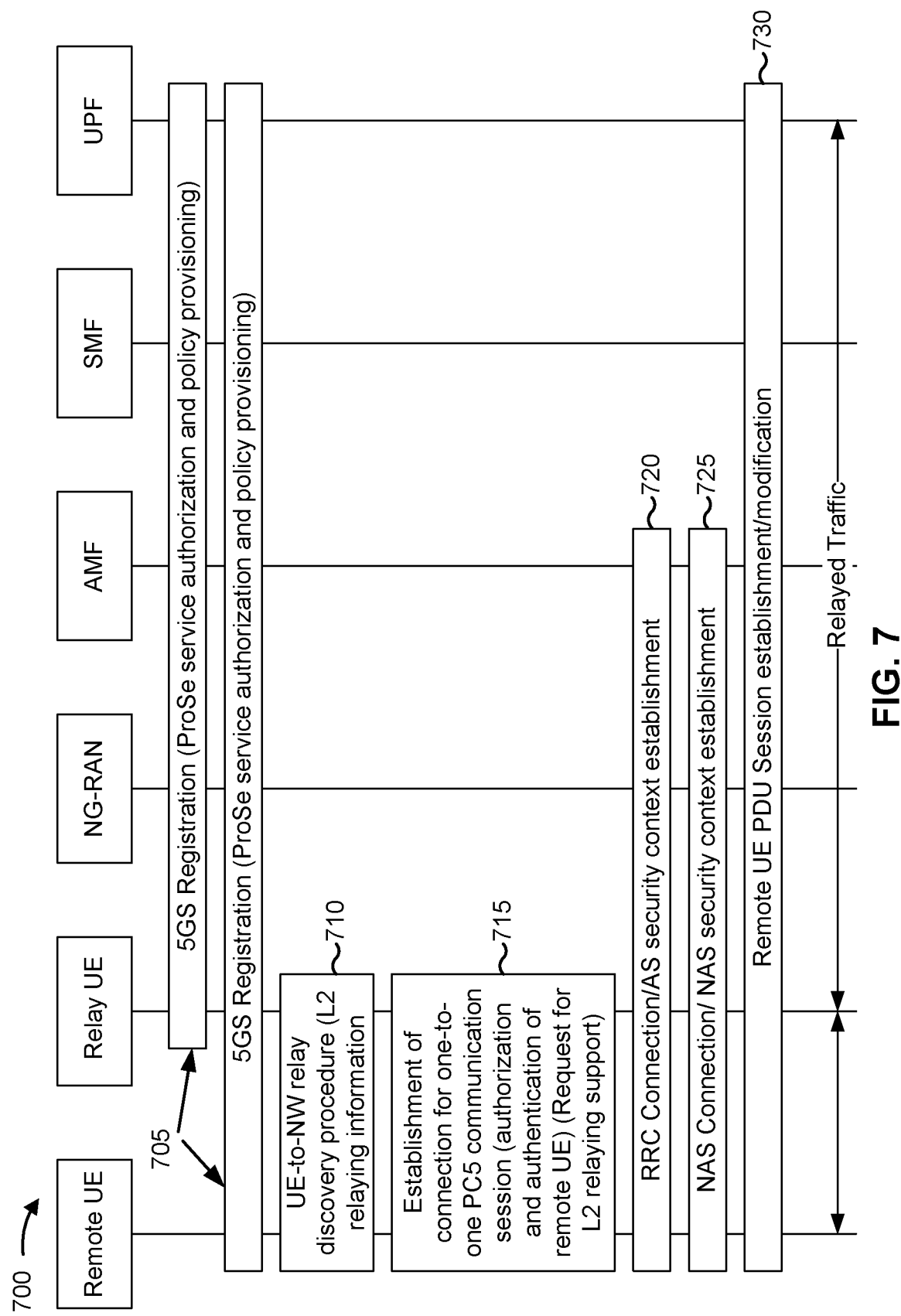
FIG. 7 is a diagram illustrating an example of registration and establishment of a sidelink connection for UEs performing sidelink communications, in accordance with the present disclosure.

FIG. 7 is a diagram illustrating an example 700 of registration and establishment of a sidelink connection for UEs performing sidelink communications, in accordance with the present disclosure. As shown, example 700 includes a remote UE (e.g., UE 120), a relay UE (e.g., UE 120), an NG-RAN, an AMF, an SMF, and a UPF. One or more of the AMF, the SMF, the UPF, the NG-RAN, or a base station (e.g., BS 110) may be referred to as a network entity.

As shown by reference number 705, the remote UE and the relay UE may perform 5G system (5GS) registration with regard to the 5G network. For example, the 5GS registration may include ProSe service authorization and policy provisioning for sidelink communication between the remote UE and the relay UE.

As shown by reference number 710, the remote UE and the relay UE may perform a discovery procedure to discover each other. For example, the remote UE and the relay UE may perform one or more of the discovery procedures described in connection with FIGS. 5 and 6. Thus, the remote UE and the relay UE may determine that the remote UE has requested an L2' relay service. For example, the relay UE may determine that the remote UE has requested the L2' relay service based at least in part on an announcement message or solicitation message described in connection with FIGS. 5 and 6. In some aspects, the relay UE may determine that the remote UE has requested an L2' based at least in part on a reserved relay service code associated with L2' relays. For example, a relay service code may indicate a type of L2 relay service that the remote UE desires to utilize. If the relay service code has a particular value or is within a particular range, the relay UE may determine that the L2 relay service is an L2' relay service. In some aspects, one or more bits (e.g., one or more first bits) of a relay service code may indicate which type of UE-to-NW relay service is supported. For example, a first bit value (e.g., 00) may indicate L3 relaying, a second bit value (e.g., 01) may indicate L2' relaying, and a third bit value (e.g., 10) may indicate both L2' and L3 relaying. In some aspects, a relay service code may indicate support of L3 relaying, L2' relaying, or both via a field or flag value received during policy provisioning of the corresponding UE.

As shown by reference number 715, the remote UE and the relay UE may set up a unicast link for relaying. For example, the remote UE and the relay UE may establish a one-to-one PC5 communication session involving authorization and authentication of the remote UE. If the remote UE and the relay UE support L2' relay services, then the remote UE and the relay UE may configure the session using respective PC5-S/PC5-RRC interfaces of the remote UE and the relay UE. As further shown, the unicast link setup may include a request for L2' relaying support. This may indicate that the one-to-one PC5 communication session is to be used for the L2' relay. Thus, the remote UE and the relay UE may configure the unicast link for the L2' relay, as described in more detail in connection with FIGS. 8 and 9.

As shown by reference number 720, the remote UE and the relay UE may perform RRC connection/AS security context establishment with the NG-RAN and/or the AMF. As shown by reference number 725, the remote UE and the relay UE may perform NAS connection/NAS security context establishment with the NG-RAN and/or the AMF. As shown by reference number 730, the remote UE and the relay UE may perform PDU session establishment or modification for the remote UE. Thereafter, the remote UE and the relay UE may communicate relayed traffic with the UPF.

As indicated above, FIG. 7 is provided as an example. Other examples may differ from what is described with respect to FIG. 7.

Figure 8:
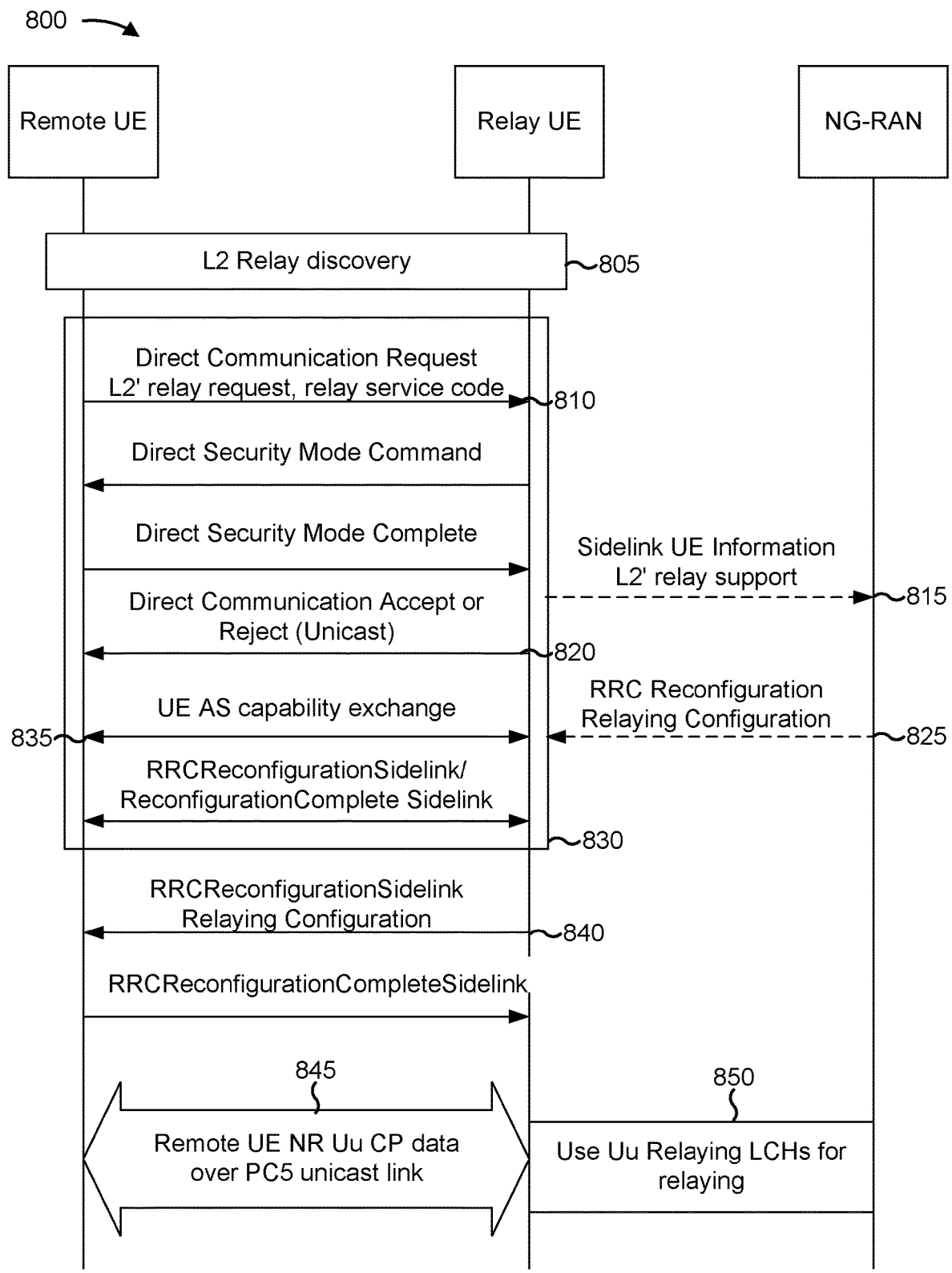
FIG. 8 is a diagram illustrating an example of configuration of a Layer 2 relay service on a sidelink in association with connection establishment, in accordance with the present disclosure.

FIG. 8 is a diagram illustrating an example 800 of configuration of a Layer 2 relay service on a sidelink in association with connection establishment, in accordance with the present disclosure. As shown, example 800 includes a relay UE, a remote UE, and an NG-RAN.

As shown in FIG. 8, and by reference number 805, the remote UE and the relay UE may perform L2 relay discovery. For example, the remote UE and the relay UE may perform one or more of the operations described with regard to FIGS. 5, 6, and 7. Thus, the remote UE may identify the relay UE as a potential relay UE for a L2' relay service. In some aspects, the remote UE may perform L2 relay discovery based at least in part on an initiation of an application associated with a particular service. For example, the remote UE may determine that the L2' relay service is to be requested based at least in part on the application initiating, and may accordingly perform L2 relay discovery in order to identify a relay UE capable of providing a L2' relay service.

As shown by reference number 810, the remote UE may provide a direct communication request to the relay UE. As further shown, the direct communication request may include a L2' relay request, also referred to herein as a request for a Layer 2 relay service. In other words, a request for a Layer 2 relay service should be understood to be a request for an L2' relay service. As further shown, the direct communication request may include a relay service code. The relay service code may identify a relay type of the L2' relay service. For example, the relay service code may identify the L2' relay service as an emergency service, a gaming service, a low-latency service, or another type of service. In some aspects, the L2' relay request and/or the relay service code may be provided in another message, such as the direct security mode complete message shown in FIG. 8.

As shown by reference number 815, in some aspects, the relay UE may provide an indication that the relay UE supports the L2' relay service to the NG-RAN. For example, the relay UE may provide the indication in sidelink UE information and/or the like. Thus, the relay UE may indicate the need for a L2' relay operation using the sidelink UE information message. In some aspects, the relay UE may provide this indication on initiating L2' relay service advertisement in order to obtain the relaying configuration. In this case, the relay UE may store the relaying configuration and may provide at least part of the relaying configuration to one or more remote UEs that connect for an L2' relay service. In some aspects, the relay UE may provide this information during unicast link setup, as illustrated in FIG. 8. For example, the relay UE may provide this information upon setting up a unicast link with a remote UE, upon setting up a unicast link with each remote UE, and/or the like.

As shown by reference number 820, the relay UE may provide, to the remote UE, information indicating whether the relay UE accepts or rejects the L2' relay service. For example, the relay UE may determine whether to accept or reject the L2' relay service based at least in part on the relay service code associated with the L2' relay service. The relay UE may provide the information indicating whether the relay UE accepts or rejects the L2' relay service in a direct communication accept message (indicating that the relay UE accepts the L2' relay service) or a direct communication reject message (indicating that the relay UE rejects the L2' relay service). In some aspects, the direct communication reject message may indicate that the relay UE rejects the L2' relay service based at least in part on a cause value. For example, the cause value may indicate that the specified L2' relay service cannot be supported or is not supported. In some aspects, the relay UE may provide the information indicating whether the relay UE accepts or rejects the L2' relay service after a direct security mode command message and/or a direct security mode complete message are exchanged between the relay UE and the remote UE (e.g., after establishment of security for the unicast link is complete).

In some aspects, a particular type of L2' relay service may be required to be accepted by the relay UE. For example, the relay UE may not be permitted to reject an emergency services L2' relay service. Thus, the likelihood of a successful L2' relay service configuration for an emergency service is improved.

As shown by reference number 825, the NG-RAN may provide, to the remote UE, a relaying configuration. For example, the NG-RAN may provide the relaying configuration in an RRC reconfiguration message and/or the like. In some aspects, the relaying configuration may identify a signaling radio bearer (SRB) configuration, such as a remote UE Uu SRB configuration. For example, the remote UE may use a Uu interface SRB to communicate with the NG-RAN via the relay UE. The remote UE Uu SRB configuration may identify a configuration for an NR-PDCP entity of the remote UE to be used for the Uu interface SRB. In some aspects, the relaying configuration may identify a PC5 AS configuration for a PC5-RLC entity of the remote UE and/or the relay UE, a PC5-MAC entity of the remote UE and/or the relay UE, a PC5-PHY entity of the remote UE and/or the relay UE, and/or the like. In some aspects, the relaying configuration may identify a Uu AS configuration for an RLC entity of the relay UE, a MAC entity of the remote UE and/or the relay UE, a PHY entity of the remote UE and/or the relay UE, and/or the like. In some aspects, the relaying configuration may identify an adaptation layer configuration for the adaptation layer of the relay UE.

In some aspects, the remote UE and/or the relay UE may be configured with the relaying configuration. For example, the remote UE and/or the relay UE may be pre-configured with the relaying configuration. In some aspects, this configuration may occur during pre-provisioning of the remote UE and/or the relay UE. In some aspects, the relaying configuration may be specified in a standard, such as a wireless telecommunication standard (e.g., a 3GPP Technical Specification). In some aspects, signaling radio bearer 0 (SRB0, which handles RRC signaling) for the remote UE, and corresponding logical channels, may be configured on the PC5 and Uu links. Additionally, or alternatively, one or more other SRBs on the remote UE may be pre-configured for the L2' relay service.

In some aspects, the messages shown by reference numbers 815 and 825 may be provided contemporaneously with one or more of the messages in the rectangle shown by reference number 830. For example, the messages shown by reference numbers 815 and 825 may be transmitted in parallel with one or more of the messages shown by reference numbers 820, 835, and/or the like.

As shown by reference number 840, the relay UE may provide at least part of the relaying configuration to the remote UE. For example, the relay UE may provide the remote UE Uu SRB configuration, the PC5 AS configuration, and/or the like. As shown, the relay UE may provide the relaying configuration in an RRC reconfiguration message, such as an RRC reconfiguration sidelink message. For example, the relay UE may reconfigure the remote UE with the relaying configuration. Thus, the relay UE may configure the PC5 unicast link with one or more SRBs to be used by the remote UE for the L2' relay service.

As shown by reference numbers 845 and 850, the remote UE and the relay UE may communicate with the NG-RAN based at least in part on the relaying configuration. For example, as shown by reference number 845, the remote UE may provide NR Uu interface control-plane data over the PC5 unicast link between the remote relay and the relay UE. The relay UE's adaptation layer may route the SRB traffic, received from the remote UE, to the appropriate Uu logical channels for communication to the NG-RAN based at least in part on the relaying configuration and/or the one or more SRBs associated with the SRB traffic. As shown by reference number 850, the relay UE may use one or more Uu relaying logical channels (LCHs), which may be identified by the relaying configuration or configured by the NG-RAN, for relaying the traffic to and/or from the NG-RAN.

As indicated above, FIG. 8 is provided as an example. Other examples may differ from what is described with regard to FIG. 8.

Figure 9:
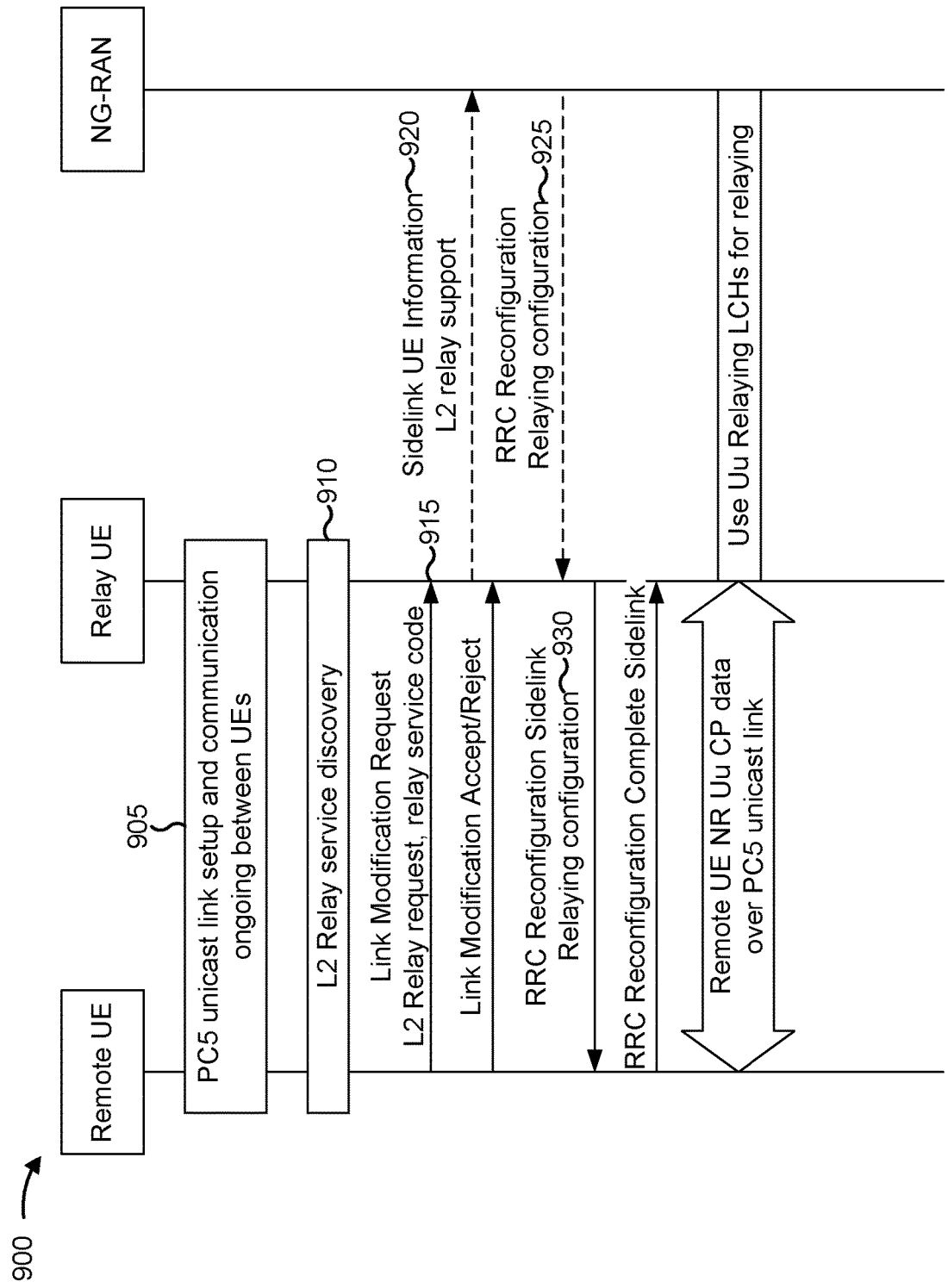
FIG. 9 is a diagram illustrating an example of configuration of a Layer 2 relay service on a sidelink in association with connection modification, in accordance with the present disclosure.

FIG. 9 is a diagram illustrating an example 900 of configuration of a Layer 2 relay service on a sidelink in association with connection modification, in accordance with the present disclosure. As shown, example 900 includes a relay UE (e.g., UE 120), a remote UE (e.g., UE 120), and an NG-RAN. As shown by reference number 905, example 900 is a scenario where a unicast link has already been set up between the remote UE and the relay UE (e.g., using the operations described with regard to FIG. 7) and communication is ongoing between the remote UE and the relay UE on the unicast link.

As shown by reference number 910, the remote UE and the relay UE may perform L2' relay service discovery, as described in more detail in connection with FIGS. 5 and 6. For example, the remote UE may determine that the relay UE associated with the PC5 unicast link supports the L2' relay service.

As shown by reference number 915, the remote UE may provide, to the relay UE, a link modification request. As further shown, the link modification request may include an L2' relay request and a relay service code corresponding to the L2' relay request. In some aspects, as shown by reference number 920, the relay UE may provide, to the NG-RAN, information indicating L2' relay support, as described in more detail in connection with FIG. 8. As shown by reference number 925, the NG-RAN may provide a relaying configuration to the relay UE based at least in part on the information indicating the L2' relay support, which is also described in more detail in connection with FIG. 8. As shown by reference number 930, the relay UE may configure the remote UE based at least in part on the relaying configuration (e.g., may configure one or more SRBs to be used for the unicast link for the L2' relay service). As further shown, the relay UE and the remote UE may communicate via the PC5 unicast and the relay UE may communicate with the NG-RAN using one or more Uu relaying logical channels. Thus, the relay UE and the remote UE may configure an existing connection for a L2' relay service via the relay UE without tearing down or releasing the existing connection, thereby improving efficiency of configuration of the L2' relay service.

Figure 10:
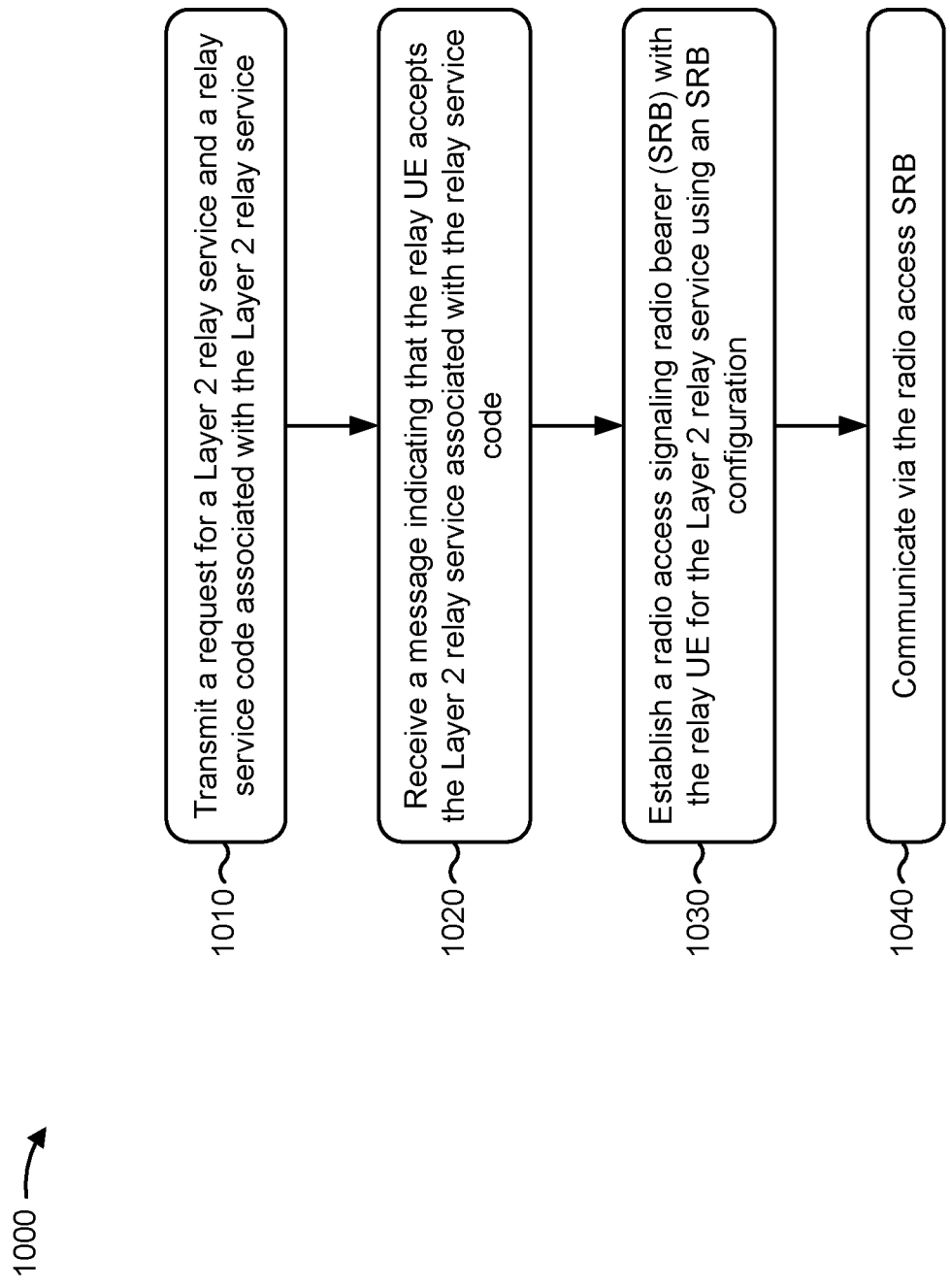
FIG. 10 is a diagram illustrating an example process performed, for example, by a user equipment, in accordance with the present disclosure.

FIG. 10 is a diagram illustrating an example process 1000 performed, for example, by a UE, in accordance with the present disclosure. Example process 1000 is an example where a remote UE (e.g., UE 120, remote UE 305, remote UE 405, and/or the like) performs operations associated with Layer 2 relay unicast link setup.

As shown in FIG. 10, in some aspects, process 1000 may include transmitting, to a relay UE, a request for a Layer 2 relay service and a relay service code associated with the Layer 2 relay service (block 1010). For example, the remote UE (e.g., using controller/processor 280, transmit processor 264, TX MIMO processor 266, MOD 254, antenna 252, and/or the like) may transmit, to a relay UE, a request for a Layer 2 relay service (e.g., an L2' relay service) and a relay service code associated with the Layer 2 relay service, as described above.

As further shown in FIG. 10, in some aspects, process 1000 may include receiving, from the relay UE, a message indicating that the relay UE accepts the Layer 2 relay service associated with the relay service code (block 1020). For example, the UE (e.g., using antenna 252, DEMOD 254, MIMO detector 256, receive processor 258, controller/processor 280, and/or the like) may receive, from the relay UE, a message indicating that the relay UE accepts the Layer 2 relay service associated with the relay service code, as described above.

As further shown in FIG. 10, in some aspects, process 1000 may include establishing a radio access SRB for the Layer 2 relay service using a remote UE radio access SRB configuration (block 1030). For example, the UE (e.g., using controller/processor 280, transmit processor 264, TX MIMO processor 266, MOD 254, antenna 252, and/or the like) may establish a radio access SRB for the Layer 2 relay service using a remote UE radio access SRB configuration, as described above.

As further shown in FIG. 10, in some aspects, process 1000 may include communicating via the radio access SRB (block 1040). For example, the UE (e.g., using controller/processor 280, transmit processor 264, TX MIMO processor 266, MOD 254, antenna 252, and/or the like) may communicate via the radio access SRB, as described above.

Process 1000 may include additional aspects, such as any single aspect or any combination of aspects described below and/or in connection with one or more other processes described elsewhere herein.

In a first aspect, the request for the Layer 2 relay service and the relay service code associated with the Layer 2 relay service are provided in a direct communication request message.

In a second aspect, alone or in combination with the first aspect, the request for the Layer 2 relay service and the relay service code associated with the Layer 2 relay service are provided in a direct security mode complete message.

In a third aspect, alone or in combination with one or more of the first and second aspects, the relay service code indicates that the Layer 2 relay service is associated with an emergency service.

In a fourth aspect, alone or in combination with one or more of the first through third aspects, process 1000 includes receiving the remote UE radio access SRB configuration from the relay UE.

In a fifth aspect, alone or in combination with one or more of the first through fourth aspects, the remote UE radio access SRB configuration is received in a sidelink radio resource control reconfiguration message.

In a sixth aspect, alone or in combination with one or more of the first through fifth aspects, the remote UE radio access SRB configuration is received with information indicating a sidelink access stratum configuration for a sidelink between the relay UE and the remote UE.

In a seventh aspect, alone or in combination with one or more of the first through sixth aspects, the remote UE is configured with the remote UE radio access SRB configuration and a sidelink access stratum configuration prior to transmitting the request for the Layer 2 relay service.

In an eighth aspect, alone or in combination with one or more of the first through seventh aspects, the request for the Layer 2 relay service and the relay service code associated with the Layer 2 relay service are provided using a link modification request message based at least in part on the remote UE and the relay UE having a unicast sidelink.

In a ninth aspect, alone or in combination with one or more of the first through eighth aspects, communicating via the radio access SRB is performed without encapsulation of traffic by a sidelink signaling or radio resource configuration entity.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
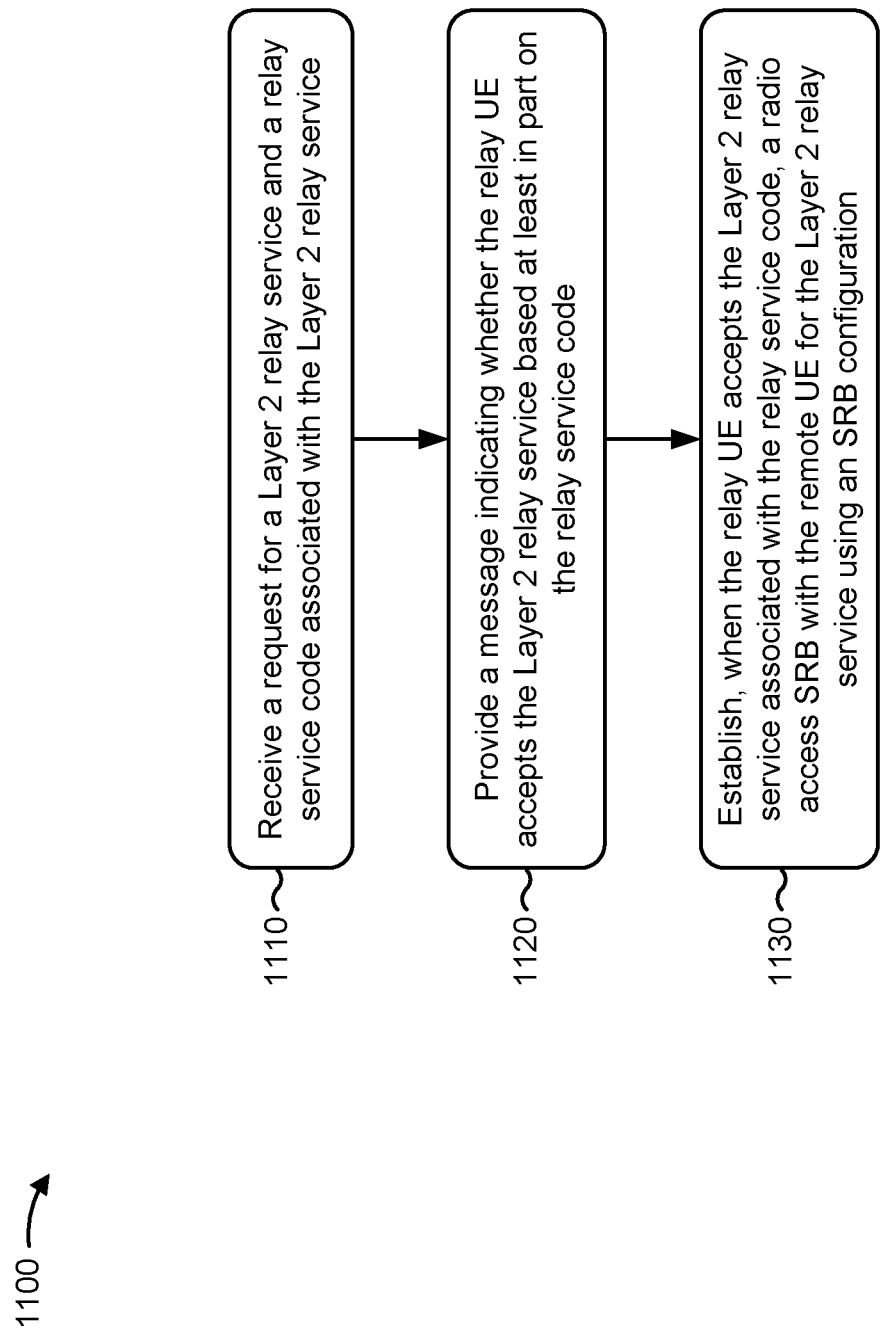
FIG. 11 is a diagram illustrating an example process performed, for example, by a user equipment, in accordance with the present disclosure.

FIG. 11 is a diagram illustrating an example process 1100 performed, for example, by a UE, in accordance with the present disclosure. Example process 1100 is an example where a relay UE (e.g., UE 120, relay UE 310, relay UE 410 and/or the like) performs operations associated with Layer 2 relay unicast link setup.

As shown in FIG. 11, in some aspects, process 1100 may include receiving, from a remote UE, a request for a Layer 2 relay service and a relay service code associated with the Layer 2 relay service (block 1110). For example, the relay UE (e.g., using antenna 252, DEMOD 254, MIMO detector 256, receive processor 258, controller/processor 280, and/or the like) may receive, from a remote UE, a request for a Layer 2 relay service and a relay service code associated with the Layer 2 relay service, as described above.

As further shown in FIG. 11, in some aspects, process 1100 may include providing, to the remote UE, a message indicating whether the relay UE accepts the Layer 2 relay service based at least in part on the relay service code (block 1120). For example, the relay UE (e.g., using controller/processor 280, transmit processor 264, TX MIMO processor 266, MOD 254, antenna 252, and/or the like) may provide, to the remote UE, a message indicating whether the relay UE accepts the Layer 2 relay service based at least in part on the relay service code, as described above.

As further shown in FIG. 11, in some aspects, process 1100 may include establishing, when the relay UE accepts the Layer 2 relay service associated with the relay service code, a radio access SRB with the remote UE for the Layer 2 relay service using a remote UE radio access SRB configuration (block 1130). For example, the relay UE (e.g., using controller/processor 280, transmit processor 264, TX MIMO processor 266, MOD 254, antenna 252, and/or the like) may establish, when the relay UE accepts the Layer 2 relay service associated with the relay service code, a radio access SRB with the remote UE for the Layer 2 relay service using a remote UE radio access SRB configuration, as described above.

Process 1100 may include additional aspects, such as any single aspect or any combination of aspects described below and/or in connection with one or more other processes described elsewhere herein.

In a first aspect, the request for the Layer 2 relay service and the relay service code associated with the Layer 2 relay service are received in a direct communication request message.

In a second aspect, alone or in combination with the first aspect, the request for the Layer 2 relay service and the relay service code associated with the Layer 2 relay service are received in a direct security mode complete message.

In a third aspect, alone or in combination with one or more of the first and second aspects, the Layer 2 relay service cannot be rejected when the relay service code indicates that the Layer 2 relay service is associated with an emergency service.

In a fourth aspect, alone or in combination with one or more of the first through third aspects, process 1100 includes providing the remote UE radio access SRB configuration to the remote UE.

In a fifth aspect, alone or in combination with one or more of the first through fourth aspects, the remote UE radio access SRB configuration is provided in a sidelink radio resource control reconfiguration message.

In a sixth aspect, alone or in combination with one or more of the first through fifth aspects, the relay UE is pre-configured with information indicating a sidelink access stratum configuration for a sidelink between the relay UE and the remote UE.

In a seventh aspect, alone or in combination with one or more of the first through sixth aspects, process 1100 includes providing, to a base station, an indication that the relay UE supports the Layer 2 relay service; and receiving a relaying configuration from the base station based at least in part on the indication.

In an eighth aspect, alone or in combination with one or more of the first through seventh aspects, the indication is provided in a sidelink UE information message.

In a ninth aspect, alone or in combination with one or more of the first through eighth aspects, the relaying configuration includes at least one of: the remote UE radio access SRB configuration, information indicating a sidelink access stratum configuration for a sidelink between the relay UE and the remote UE, a radio access stratum configuration for a radio access link between the relay UE and the base station, or an adaptation layer configuration for handling the remote UE.

In a tenth aspect, alone or in combination with one or more of the first through ninth aspects, the indication that the relay UE supports the Layer 2 relay service is provided after the request for the Layer 2 relay service is received.

In an eleventh aspect, alone or in combination with one or more of the first through tenth aspects, the indication that the relay UE supports the Layer 2 relay service is provided contemporaneously with the message indicating whether the relay UE accepts the Layer 2 relay service.

In a twelfth aspect, alone or in combination with one or more of the first through eleventh aspects, the indication that the relay UE supports the Layer 2 relay service is provided contemporaneously with advertising a Layer 2 relay service capability of the relay UE.

In a thirteenth aspect, alone or in combination with one or more of the first through twelfth aspects, the indication that the relay UE supports the Layer 2 relay service is provided before the remote UE connects to the relay UE.

In a fourteenth aspect, alone or in combination with one or more of the first through thirteenth aspects, the indication that the relay UE supports the Layer 2 relay service is provided during a unicast link setup for the remote UE.

In a fifteenth aspect, alone or in combination with one or more of the first through fourteenth aspects, the request for the Layer 2 relay service and the relay service code associated with the Layer 2 relay service are received using a link modification request message based at least in part on the remote UE and the relay UE having a unicast sidelink.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
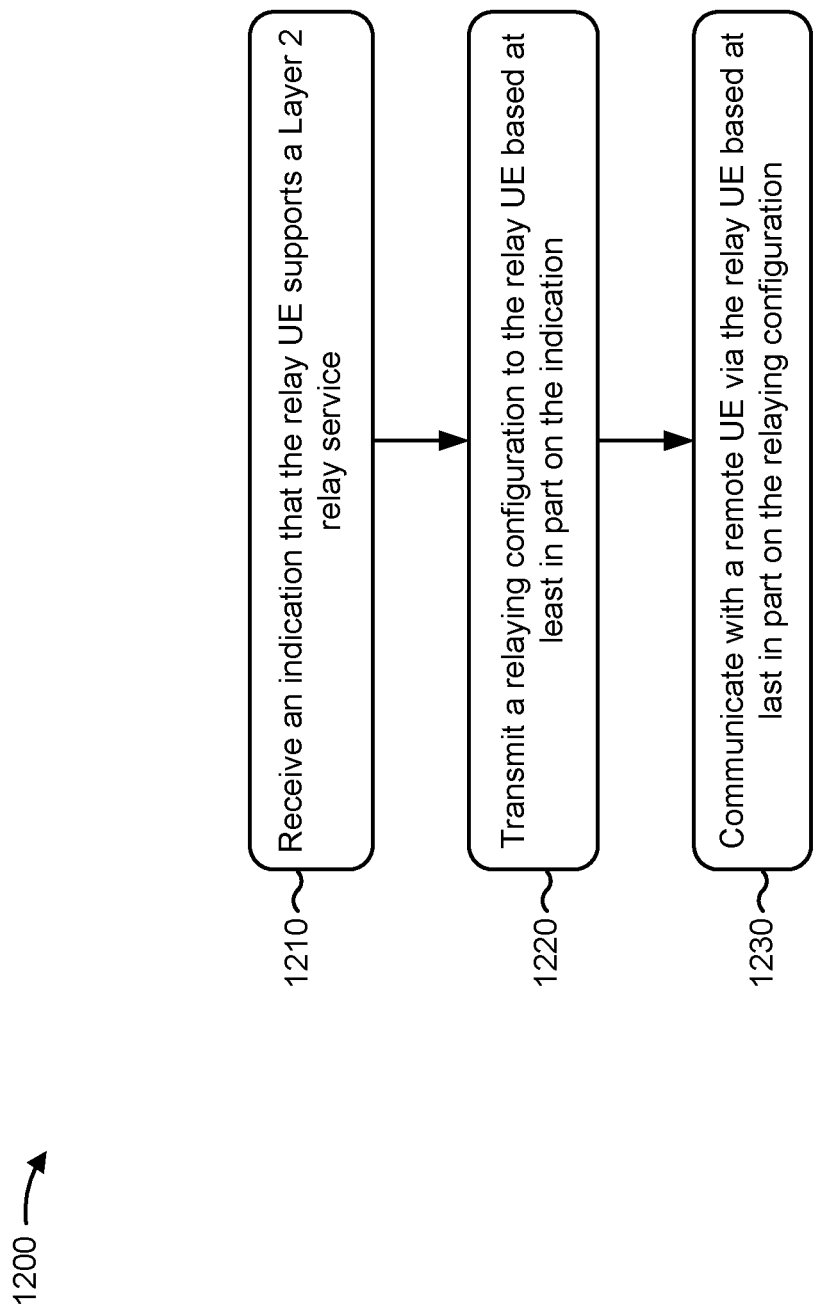
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., BS 110, the NG-RAN, SMF, UPF, or AMF of FIGS. 3-9, and/or the like) performs operations associated with Layer 2 relay unicast link setup.

As shown in FIG. 12, in some aspects, process 1200 may include receiving, from a relay UE, an indication that the relay UE supports a Layer 2 relay service (block 1210). For example, the base station (e.g., using antenna 234, DEMOD 232, MIMO detector 236, receive processor 238, controller/processor 240, and/or the like) may receive, from a relay UE, an indication that the relay UE supports a Layer 2 relay service, as described above.

As further shown in FIG. 12, in some aspects, process 1200 may include transmitting a relaying configuration to the relay UE based at least in part on the indication (block 1220). For example, the base station (e.g., using controller/processor 240, transmit processor 220, TX MIMO processor 230, MOD 232, antenna 234, and/or the like) may transmit a relaying configuration to the relay UE based at least in part on the indication, as described above.

As further shown in FIG. 12, in some aspects, process 1200 may include communicating with a remote UE via the relay UE based at last in part on the relaying configuration (block 1230). For example, the base station (e.g., using controller/processor 240, transmit processor 220, TX MIMO processor 230, MOD 232, antenna 234, and/or the like) may communicate with a remote UE via the relay UE based at last in part on the relaying configuration, as described above.

Process 1200 may include additional aspects, such as any single aspect or any combination of aspects described below and/or in connection with one or more other processes described elsewhere herein.

In a first aspect, the indication is received in a sidelink UE information message.

In a second aspect, alone or in combination with the first aspect, the relaying configuration includes at least one of: a remote UE radio access SRB configuration, information indicating a sidelink access stratum configuration for a sidelink between the relay UE and the remote UE, a radio access stratum configuration for a radio access link between the relay UE and the base station, or an adaptation layer configuration for handling the remote UE.

In a third aspect, alone or in combination with one or more of the first and second aspects, the indication that the relay UE supports the Layer 2 relay service is received contemporaneously with an advertisement of a Layer 2 relay service capability of the relay UE.

In a fourth aspect, alone or in combination with one or more of the first through third aspects, the indication that the relay UE supports the Layer 2 relay service is received before the remote UE connects to the relay UE.

In a fifth aspect, alone or in combination with one or more of the first through fourth aspects, the indication that the relay UE supports the Layer 2 relay service is received during a unicast link setup or link modification for the remote UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a remote user equipment (UE), comprising: transmitting, to a relay UE, a request for a Layer 2 relay service and a relay service code associated with the Layer 2 relay service; receiving, from the relay UE, a message indicating that the relay UE accepts the Layer 2 relay service associated with the relay service code; establishing a radio access signaling radio bearer (SRB) for the Layer 2 relay service using a remote UE radio access SRB configuration; and communicating via the radio access SRB.

Aspect 2: The method of Aspect 1, wherein the request for the Layer 2 relay service and the relay service code associated with the Layer 2 relay service are provided in a direct communication request message.

Aspect 3: The method of Aspect 1, wherein the request for the Layer 2 relay service and the relay service code associated with the Layer 2 relay service are provided in a direct security mode complete message.

Aspect 4: The method of any of Aspects 1-3, wherein the relay service code indicates that the Layer 2 relay service is associated with an emergency service.

Aspect 5: The method of any of Aspects 1-4, further comprising: receiving the remote UE radio access SRB configuration from the relay UE.

Aspect 6: The method of Aspect 5, wherein the remote UE radio access SRB configuration is received in a sidelink radio resource control reconfiguration message.

Aspect 7: The method of Aspect 5, wherein the remote UE radio access SRB configuration is received with information indicating a sidelink access stratum configuration for a sidelink between the relay UE and the remote UE.

Aspect 8: The method of any of Aspects 1-7, wherein the remote UE is configured with the remote UE radio access SRB configuration and a sidelink access stratum configuration prior to transmitting the request for the Layer 2 relay service.

Aspect 9: The method of any of Aspects 1-8, wherein the request for the Layer 2 relay service and the relay service code associated with the Layer 2 relay service are provided using a link modification request message based at least in part on the remote UE and the relay UE having a unicast sidelink.

Aspect 10: The method of any of Aspects 1-9, wherein communicating via the radio access SRB is performed without encapsulation of traffic by a sidelink signaling or radio resource configuration entity.

Aspect 11: A method of wireless communication performed by a relay user equipment (UE), comprising: receiving, from a remote UE, a request for a Layer 2 relay service and a relay service code associated with the Layer 2 relay service; providing, to the remote UE, a message indicating whether the relay UE accepts the Layer 2 relay service based at least in part on the relay service code; and establishing, when the relay UE accepts the Layer 2 relay service associated with the relay service code, a radio access signaling radio bearer (SRB) with the remote UE for the Layer 2 relay service using a remote UE radio access SRB configuration.

Aspect 12: The method of Aspect 11, wherein the Layer 2 relay service cannot be rejected when the relay service code indicates that the Layer 2 relay service is associated with an emergency service.

Aspect 13: The method of any of Aspects 11-12, further comprising: providing the remote UE radio access SRB configuration to the remote UE.

Aspect 14: The method of Aspect 13, wherein the remote UE radio access SRB configuration is provided in a sidelink radio resource control reconfiguration message.

Aspect 15: The method of Aspect 13, wherein the relay UE is pre-configured with information indicating a sidelink access stratum configuration for a sidelink between the relay UE and the remote UE.

Aspect 16: The method of any of Aspects 11-15, further comprising:
providing, to a base station, an indication that the relay UE supports the Layer 2 relay service; and receiving a relaying configuration from the base station based at least in part on the indication.

Aspect 17: The method of Aspect 16, wherein the relaying configuration includes at least one of: the remote UE radio access SRB configuration, information indicating a sidelink access stratum configuration for a sidelink between the relay UE and the remote UE, a radio access stratum configuration for a radio access link between the relay UE and the base station, or an adaptation layer configuration for handling the remote UE.

Aspect 18: The method of Aspect 16, wherein the indication that the relay UE supports the Layer 2 relay service is provided after the request for the Layer 2 relay service is received.

Aspect 19: The method of Aspect 16, wherein the indication that the relay UE supports the Layer 2 relay service is provided contemporaneously with the message indicating whether the relay UE accepts the Layer 2 relay service.

Aspect 20: The method of Aspect 16, wherein the indication that the relay UE supports the Layer 2 relay service is provided contemporaneously with advertising a Layer 2 relay service capability of the relay UE.

Aspect 21: The method of Aspect 16, wherein the indication that the relay UE supports the Layer 2 relay service is provided before the remote UE connects to the relay UE.

Aspect 22: The method of Aspect 16, wherein the indication that the relay UE supports the Layer 2 relay service is provided during a unicast link setup for the remote UE.

Aspect 23: The method of any of Aspects 11-22, wherein the request for the Layer 2 relay service and the relay service code associated with the Layer 2 relay service are received using a link modification request message based at least in part on the remote UE and the relay UE having a unicast sidelink.

Aspect 24: A method of wireless communication performed by a base station, comprising: receiving, from a relay user equipment (UE), an indication that the relay UE supports a Layer 2 relay service; transmitting a relaying configuration to the relay UE based at least in part on the indication; and communicating with a remote UE via the relay UE based at last in part on the relaying configuration.

Aspect 25: The method of Aspect 24, wherein the indication is received in a sidelink UE information message.

Aspect 26: The method of any of Aspects 24-25, wherein the relaying configuration includes at least one of: a remote UE radio access signaling radio bearer (SRB) configuration, information indicating a sidelink access stratum configuration for a sidelink between the relay UE and the remote UE, a radio access stratum configuration for a radio access link between the relay UE and the base station, or an adaptation layer configuration for handling the remote UE.

Aspect 27: The method of any of Aspects 24-26, wherein the indication that the relay UE supports the Layer 2 relay service is received contemporaneously with an advertisement of a Layer 2 relay service capability of the relay UE.

Aspect 28: The method of any of Aspects 24-27, wherein the indication that the relay UE supports the Layer 2 relay service is received before the remote UE connects to the relay UE.

Aspect 29: The method of any of Aspects 24-28, wherein the indication that the relay UE supports the Layer 2 relay service is received during a unicast link setup or link modification for the remote UE.

Aspect 30: An apparatus for wireless communication at a device, comprising a processor; memory coupled with the processor; and instructions stored in the memory and executable by the processor to cause the apparatus to perform the method of one or more Aspects of Aspects 1-29.

Aspect 31: A device for wireless communication, comprising a memory and one or more processors coupled to the memory, the memory and the one or more processors configured to perform the method of one or more Aspects of Aspects 1-29.

Aspect 32: An apparatus for wireless communication, comprising at least one means for performing the method of one or more Aspects of Aspects 1-29.

Aspect 33: A non-transitory computer-readable medium storing code for wireless communication, the code comprising instructions executable by a processor to perform the method of one or more Aspects of Aspects 1-29.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-29.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a remote user equipment (UE), comprising:
    transmitting, to a relay UE, a request for a Layer 2 relay service and a relay service code associated with the Layer 2 relay service, the relay service code identifying a relay type of the Layer 2 relay service;
    receiving, from the relay UE, a message indicating whether the relay UE accepts the Layer 2 relay service associated with the relay service code,
        wherein the message indicates that the relay UE accepts the Layer 2 relay service when the relay service code indicates that the Layer 2 relay service is associated with an emergency service, and
        wherein the message indicates that the relay UE rejects the Layer 2 relay service when the relay service code indicates that the Layer 2 relay service comprises a type of Layer 2 relay service that is not associated with the emergency service;
    establishing, based at least in part on the message indicating that the relay UE accepts the Layer 2 relay service associated with the relay service code, a radio access signaling radio bearer (SRB) for the Layer 2 relay service using a remote UE radio access SRB configuration, wherein the radio access SRB for the Layer 2 relay service is established based at least in part on the relay UE providing, to a base station, an indication that the relay UE supports the Layer 2 relay service and receiving a relaying configuration from the base station based at least in part on the indication; and communicating via the radio access SRB.

2. The method of claim 1, wherein the request for the Layer 2 relay service and the relay service code associated with the Layer 2 relay service are provided in a direct communication request message.

3. The method of claim 1, wherein the request for the Layer 2 relay service and the relay service code associated with the Layer 2 relay service are provided in a direct security mode complete message.

4. The method of claim 1, wherein the message indicates that the relay UE accepts the Layer 2 relay service when the Layer 2 relay service is associated with the emergency service, a gaming service, or a low-latency service.

5. The method of claim 1, further comprising:
receiving the remote UE radio access SRB configuration from the relay UE.

6. The method of claim 5, wherein the remote UE radio access SRB configuration is received in a sidelink radio resource control reconfiguration message.

7. The method of claim 5, wherein the remote UE radio access SRB configuration is received with information indicating a sidelink access stratum configuration for a sidelink between the relay UE and the remote UE.

8. The method of claim 1, wherein the remote UE is configured with the remote UE radio access SRB configuration and a sidelink access stratum configuration prior to transmitting the request for the Layer 2 relay service.

9. The method of claim 1, wherein the request for the Layer 2 relay service and the relay service code associated with the Layer 2 relay service are provided using a link modification request message based at least in part on the remote UE and the relay UE having a unicast sidelink.

10. The method of claim 1, wherein communicating via the radio access SRB is performed without encapsulation of traffic by a sidelink signaling or radio resource configuration entity.

11. A method of wireless communication performed by a relay user equipment (UE), comprising:
receiving, from a remote UE, a request for a Layer 2 relay service and a relay service code associated with the Layer 2 relay service, the relay service code identifying a relay type of the Layer 2 relay service;
providing, to the remote UE, a message indicating whether the relay UE accepts the Layer 2 relay service based at least in part on the relay service code,
wherein the message indicates that the relay UE accepts the Layer 2 relay service when the relay service code indicates that the Layer 2 relay service is associated with an emergency service, and
wherein the message indicates that the relay UE rejects the Layer 2 relay service when the relay service code indicates that the Layer 2 relay service is not associated with the emergency service;
providing, to a base station and based at least in part on the message indicating that the relay UE accepts the Layer 2 relay service associated with the relay service code, an indication that the relay UE supports the Layer 2 relay service;
receiving a relaying configuration from the base station based at least in part on the indication; and
establishing, when the relay UE accepts the Layer 2 relay service associated with the relay service code, a radio access signaling radio bearer (SRB) with the remote UE for the Layer 2 relay service using a remote UE radio access SRB configuration.

12. The method of claim 11, wherein the Layer 2 relay service cannot be rejected when the relay service code indicates that the Layer 2 relay service is associated with the emergency service.

13. The method of claim 11, further comprising:
providing the remote UE radio access SRB configuration to the remote UE.

14. The method of claim 13, wherein the remote UE radio access SRB configuration is provided in a sidelink radio resource control reconfiguration message.

15. The method of claim 13, wherein the relay UE is pre-configured with information indicating a sidelink access stratum configuration for a sidelink between the relay UE and the remote UE.

16. The method of claim 11, wherein the relaying configuration includes at least one of:
the remote UE radio access SRB configuration,
information indicating a sidelink access stratum configuration for a sidelink between the relay UE and the remote UE,
a radio access stratum configuration for a radio access link between the relay UE and the base station, or
an adaptation layer configuration for handling the remote UE.

17. The method of claim 11, wherein the indication that the relay UE supports the Layer 2 relay service is provided after the request for the Layer 2 relay service is received.

18. The method of claim 11, wherein the indication that the relay UE supports the Layer 2 relay service is provided contemporaneously with the message indicating whether the relay UE accepts the Layer 2 relay service.

19. The method of claim 11, wherein the indication that the relay UE supports the Layer 2 relay service is provided contemporaneously with advertising a Layer 2 relay service capability of the relay UE.

20. The method of claim 11, wherein the indication that the relay UE supports the Layer 2 relay service is provided before the remote UE connects to the relay UE.

21. The method of claim 11, wherein the indication that the relay UE supports the Layer 2 relay service is provided during a unicast link setup for the remote UE.

22. The method of claim 11, wherein the request for the Layer 2 relay service and the relay service code associated with the Layer 2 relay service are received using a link modification request message based at least in part on the remote UE and the relay UE having a unicast sidelink.

23. A remote user equipment (UE) for wireless communication, comprising:
a memory; and
one or more processors coupled to the memory, the one or more processors configured to:
transmit, to a relay UE, a request for a Layer 2 relay service and a relay service code associated with the Layer 2 relay service, the relay service code identifying a relay type of the Layer 2 relay service;
receive, from the relay UE, a message indicating whether the relay UE accepts the Layer 2 relay service associated with the relay service code,
wherein the message indicates that the relay UE accepts the Layer 2 relay service when the relay service code indicates that the Layer 2 relay service is associated with an emergency service, and wherein the message indicates that the relay UE rejects the Layer 2 relay service when the relay service code indicates that the Layer 2 relay service comprises a type of Layer 2 relay service that is not associated with the emergency service;

establish, based at least in part on the message indicating that the relay UE accepts the Layer 2 relay service associated with the relay service code, a radio access signaling radio bearer (SRB) for the Layer 2 relay service using a remote UE radio access SRB configuration, wherein the radio access SRB for the Layer 2 relay service is established based at least in part on the relay UE providing, to a base station, an indication that the relay UE supports the Layer 2 relay service and receiving a relaying configuration from the base station based at least in part on the indication; and communicate via the radio access SRB.

24. The remote UE of claim 23, wherein communicating via the radio access SRB is performed without encapsulation of traffic by a sidelink signaling or radio resource configuration entity.

25. A relay user equipment (UE) for wireless communication, comprising:

a memory; and one or more processors coupled to the memory, the one or more processors configured to:

receive, from a remote UE, a request for a Layer 2 relay service and a relay service code associated with the Layer 2 relay service, the relay service code identifying a relay type of the Layer 2 relay service;

provide, to the remote UE, a message indicating whether the relay UE accepts the Layer 2 relay service based at least in part on the relay service code, wherein the message indicates that the relay UE accepts the Layer 2 relay service when the relay service code indicates that the Layer 2 relay service is associated with an emergency service, and wherein the message indicates that the relay UE rejects the Layer 2 relay service when the relay service code indicates that the Layer 2 relay service is not associated with the emergency service; and establish, when the relay UE accepts the Layer 2 relay service associated with the relay service code, a radio access signaling radio bearer (SRB) with the remote UE for the Layer 2 relay service using a remote UE radio access SRB configuration.

26. The relay UE of claim 25, wherein the Layer 2 relay service cannot be rejected when the relay service code indicates that the Layer 2 relay service is associated with the emergency service.

27. The relay UE of claim 25, wherein the one or processors are further configured to:

provide the remote UE radio access SRB configuration to the remote UE.

28. The relay UE of claim 27, wherein the remote UE radio access SRB configuration is provided in a sidelink radio resource control reconfiguration message.

29. The relay UE of claim 27, wherein the relay UE is pre-configured with information indicating a sidelink access stratum configuration for a sidelink between the relay UE and the remote UE.

30. The relay UE of claim 25, wherein the relaying configuration includes at least one of:

the remote UE radio access SRB configuration, information indicating a sidelink access stratum configuration for a sidelink between the relay UE and the remote UE, a radio access stratum configuration for a radio access link between the relay UE and a base station, or an adaptation layer configuration for handling the remote UE.

* * * * *